United States Patent
Mandella

(10) Patent No.: US 6,643,068 B2
(45) Date of Patent: *Nov. 4, 2003

(54) COLLIMATORS AND COLLIMATOR ARRAYS EMPLOYING ELLIPSOIDAL SOLID IMMERSION LENSES

(76) Inventor: Michael J. Mandella, 347 Cowper St., Palo Alto, CA (US) 94301

( * ) Notice: Subject to any disclaimer, the term of this patent is extended or adjusted under 35 U.S.C. 154(b) by 0 days.

This patent is subject to a terminal disclaimer.

(21) Appl. No.: 10/189,314

(22) Filed: Jul. 1, 2002

(65) Prior Publication Data

US 2003/0043472 A1 Mar. 6, 2003

Related U.S. Application Data

(63) Continuation-in-part of application No. 09/792,383, filed on Feb. 21, 2001, now Pat. No. 6,452,726, which is a continuation-in-part of application No. 09/698,993, filed on Oct. 27, 2000, now Pat. No. 6,456,439, which is a continuation-in-part of application No. 09/354,841, filed on Jul. 16, 1999, now Pat. No. 6,181,478.

(51) Int. Cl.$^7$ .............................................. G02B 27/10
(52) U.S. Cl. ..................... 359/628; 359/642; 359/708; 359/712; 385/33
(58) Field of Search ...................... 359/642, 656–661, 359/708, 712, 619–620, 626–628, 641; 385/14–15, 31, 33–35, 39, 43

(56) References Cited

U.S. PATENT DOCUMENTS

| | | | |
|---|---|---|---|
| 4,737,006 A | 4/1988 | Warbrick ..................... 385/33 |
| 4,770,514 A | 9/1988 | Silverglate .................. 359/728 |
| 4,962,988 A | 10/1990 | Swann ........................ 385/34 |
| 5,600,492 A | 2/1997 | Tanaka et al. .............. 359/712 |
| 5,654,831 A | 8/1997 | Byren et al. ................ 359/718 |
| 5,832,153 A | * 11/1998 | Duck ........................... 385/34 |
| 5,910,940 A | 6/1999 | Guerra ..................... 369/275.1 |
| 5,917,660 A | 6/1999 | Ohtaki ....................... 359/710 |
| 5,978,139 A | 11/1999 | Hatakoshi et al. .......... 359/565 |
| 5,991,098 A | 11/1999 | Pareto ........................ 359/718 |
| 6,033,515 A | 3/2000 | Walters et al. ........... 156/272.8 |
| 6,452,726 B1 | * 9/2002 | Mandella .................... 359/641 |
| 2001/0019378 A1 | * 9/2001 | Yamaguchi .................. 349/61 |

OTHER PUBLICATIONS

Fletcher, D.A., et al., "Near Field Infrared Imaging with a Microfabricated Solid Immersion Lens", Applied Physics Letters, vol. 77, No. 14, Oct. 2, 2000, pp. 2109–2111.

* cited by examiner

*Primary Examiner*—Jordan M. Schwartz
(74) *Attorney, Agent, or Firm*—Lumen Intellectual Property Services, Inc.

(57) ABSTRACT

An ellipsoidal solid immersion lens (ESIL) for use as a collimator for a waveguide. The ESIL has a refractive index n, an ellipsoidal surface portion defining a geometrical ellipsoid with geometrical foci $F_1$, $F_2$ along a major axis of length M. The ESIL has an attachment surface portion for joining to the waveguide. The attachment surface portion passes near or through the second geometrical focus $F_2$. The geometrical foci $F_1$, $F_2$ are separated by a distance $S=M/n$, such that a substantially collimated light beam exhibiting a Gaussian type intensity profile propagating along the major axis M and entering the ESIL through the ellipsoidal surface portion converges to a Gaussian beam waist substantially at the second geometrical focus $F_2$. The ESIL, or more generally any SIL, may be incorporated into a collimated array of lenses within a monolithic body having a substrate with a substantially uniform index of refraction and a pedestal comprising an attachment surface portion for attaching waveguides to the SIL.

8 Claims, 7 Drawing Sheets

COLLIMATORS AND COLLIMATOR ARRAYS EMPLOYING ELLIPSOIDAL SOLID IMMERSION LENSES

RELATED APPLICATIONS

This application is a continuation-in-part of application Ser. No. 09/792,383, filed Feb. 21, 2001, now U.S. Pat. No. 6,452,726 which is a continuation-in-part of application Ser. No. 09/698,993, filed Oct. 27, 2000, now U.S. Pat. No. 6,456,439, which is a continuation-in-part of application Ser. No. 09/354,841, filed Jul. 16, 1999, now U.S. Pat. No. 6,181,478.

FIELD OF INVENTION

This invention generally relates to solid immersion lenses and collimators using such solid immersion lenses.

BACKGROUND OF THE INVENTION

In many optical systems and applications, such as near-field microscopy, imaging, photolithography and optical storage it is important to reduce the spot size and thus obtain higher definition or resolution. The spot size of an optical system, e.g., an optical storage system, is commonly defined as the distance between half power points. This distance is determined by diffraction to be approximately $\lambda/(2 \cdot NA)$, where $\lambda$ is the free space wavelength of the light used and NA is the numerical aperture of the objective lens focusing the light beam. NA is defined as $NA=n\sin(\theta)$, where $\theta$ is the half cone angle of the focused light rays and n is the index of refraction of the medium in which $\theta$ is measured.

One way to improve the definition is to work at shorter wavelengths $\lambda$, e.g., in the green or blue range, and to increase the numerical aperture to be as close to one as possible. A further possibility is to employ near-field optics in the manner described by Betzig et al. in *Applied Physics Letters*, Vol. 62, pp. 142 (1992), using a tapered fiber with a metal film with a small pinhole at the end. The definition of the system is determined by the size of the pinhole, and can be 50 nm or less. The advantages of the fiber probe system are its excellent definition and its polarization preserving capability which is particularly useful in magneto-optic storage applications. The disadvantages of the system are its poor light efficiency and the fact that it can only observe a single spot at a time, thus limiting its tracking ability when used for optical storage.

Another alternative is to use a solid immersion lens (SIL) between the objective lens and the illuminated object, e.g., an optical recording medium or sample under investigation. The SIL is placed within a wavelength $\lambda$ or less (in the near-field) of the object. Optical systems taking advantage of appropriate SILs are described, e.g., by S. M. Mansfield et al. "Solid Immersion Microscope", Applied Physics Letters, Vol. 57, pp. 2615–6 (1990); S. M. Mansfield et al. "High Numerical Aperture Lens System for Optical Storage", Optics Letters, Vol. 18, pp. 305–7 (1993) and in U.S. Pat. No. 5,004,307 issued to G. S. Kino et al. In this patent Kino et al. teach the use of a high refractive index SIL having a spherical surface facing the objective lens and a flat front surface facing an object to be examined. The use of this SIL enables one to go beyond the Rayleigh diffraction limit in air. In one embodiment, the SIL is employed in a near-field application in a reflection optical microscope to increase the resolution of the microscope by the factor of 1/n, where n is the index of refraction of the SIL.

A paper by G. S. Kino presented at the SPIE Conference on Far- and Near-Field Optics, "Fields Associated with the Solid Immersion Lens", SPIE, Vol. 3467, pp. 128–37 (1998) describes in more detail the principles of operation of two particular SILs. The first is a hemispherical SIL and the second is a supersphere SIL or a stigmatic SIL. The hemispherical SIL improves the effective NA of the objective lens by the refractive index n of the SIL and decreases the spot size by 1/n. The supersphere SIL increases the effective NA of the objective lens by the square of the refractive index $n^2$ and obtains a focus at a distance a/n from the center of the supersphere, where a is the sphere's radius. The spot size is reduced by a factor of $n^2$. The performance characteristics and theoretical limitations of both types of SILs are also discussed.

SILs have found multiple applications. For example, Corle et al. in U.S. Pat. No. 5,125,750 teach the use of a SIL in an optical recording system to reduce the spot size in an optical recording medium. These SILs typically have a spherical surface facing the objective lens and a flat surface facing an optical recording medium. The flat surface is in close proximity to the medium.

In U.S. Pat. No. 5,497,359 Mamin et al. teach the use of a superhemisphere SIL in a radiation-transparent air bearing slider employed in an optical disk data storage system. Lee et al. in U.S. Pat. No. 5,729,393 also teach an optical storage system utilizing a flying head using a SIL with a raised central surface facing the medium. In U.S. Pat. No. 5,881,042 Knight teaches a flying head with a SIL partially mounted on a slider in an optical recording system. This slider incorporates the objective lens and it can be used in a magneto-optic storage system. Finally, in U.S. Pat. No. 5,883,872 Kino teaches the use of a SIL with a mask having a slit for further reducing the spot size and thus increasing the optical recording density in an optical storage system, e.g., a magneto-optic storage system.

The prior art SILs as well as the optical systems using them have a number of shortcomings. Hemispherical SILs suffer from back reflection problems. These degrade system performance, especially when the light source is a laser, e.g., a laser diode, and the back reflection is coupled back into the laser. Also, the ray reflected from the spherical surface and the ray reflected from the flat surface or from an object just below the flat surface are coincident. This gives rise to undesirable interference effects.

Superhemispherical SILs have reduced back reflection. However, they demagnify the image of the object by a larger factor than hemispherical SILs. For example, the demagnification of superhemispherical SILs in the axial direction is $1/n^3$. Because of this, the length tolerance for the superhemispherical SIL is very tight. Both the hemispherical and superhemispherical SILs increase the effective NA ($NA_{eff}$) of the objective lens (for hemispherical SIL $NA_{eff}=NA_{objective} \cdot n$; and for superhemispherical SIL $NA_{eff}=NA_{objective} \cdot n^2$). The maximum $NA_{eff}$ that can be obtained by either type of SIL is $NA_{eff}=n$.

Hemispherical, superhemispherical and related SILs experience alignment problems because optical systems employing them require the use of a separate objective lens. This separate lens has to be accurately aligned with the SIL. In many optical systems alignment between these two lenses cannot be easily preserved due to external influences (vibrations, stresses, thermal effects etc.). In addition, in systems where the number of parts is to be small, e.g., for weight and size reasons the objective lens is cumbersome.

Also it is well known in the art that a plurality of lenses (or micro-lenses) can be fabricated within a monolithic body in an ordered arrangement to comprise a lens array (or micro-lens array). Such lens arrays may be formed by processes that include photolithography, etching, ion milling, reflowed photoresist methods, molding, and thermal bonding methods as described in Optics & Photonics News, September 1999, pp. 19–22, and in "Microoptics", by Stefan Sinzinger and Jurgen Jahns, Wiley-VCH, 1999. Unfortunately, the arrays disclosed in the prior art do not effectively overcome the difficulties associated with attaching multiple waveguides to a monolithic body in precise alignment with the corresponding lenses.

In addition, there is a need in the industry to develop effective, light-weight and easy to use collimators for waveguides such as optical fibers. The fusing of lenses, e.g., graded index lenses (GRINs), to the ends of fibers is known and described, e.g., in U.S. Pat. No. 4,737,006 to Warbrick, U.S. Pat. No. 4,962,988 to Swann and U.S. Pat. No. 6,033,515 to Walters et al. These patents also teach techniques for performing fusion splicing of a lens to the fiber. Additional fusion splicing techniques are described, e.g., in U.S. Pat. No. 5,299,274 to Wysocki et al. and U.S. Pat. No. 5,745,311 to Fukuoka et al. These and other prior art fusion spliced parts and splicers attempt to overcome alignment problems encountered in these techniques.

Unfortunately, prior art SILs require additional objective lenses, as mentioned above, and require precise alignment with those. Hence proper splicing with a waveguide, e.g., a fiber, is only one of the problems. Monolithic arrays further increase the difficulties associated with proper alignment as multiple waveguides must now be precisely aligned with each SIL. It would be an advance in the art if SILs and SIL arrays which are less tolerant to alignment problems could be developed for fusion splicing with waveguides and advantageously used to collimate the respective diverging beams of light emerging from the waveguides. It would also be an advance in the art to develop micro-SIL arrays for respectively collimating the diffraction-limited Gaussian beams emerging from a large number of single-mode optical fibers arranged in a high density packaging configuration (fiber array).

OBJECTS AND ADVANTAGES

Accordingly, it is a primary object of the present invention to provide a solid immersion lens (SIL) which overcomes the prior art limitations and ensures a small spot size. It is a specific object of the invention to integrate the objective lens and the solid immersion lens into a single collimator.

It is a further object of the invention to provide such an integrated SIL for fusion splicing applications with waveguides such as optical fibers. Additionally, it is a specific object of the invention to provide means for reinforcing the attachment of waveguides to the SILs.

It is another primary object of the invention to provide a monolithic array which overcomes the prior art shortcomings in precisely aligning attached waveguides.

Further objects and advantages will become apparent upon reading the detailed description.

SUMMARY

The objects and advantages of the invention are secured by a collimator integrated with a waveguide and employing an ellipsoidal solid immersion lens (ESIL). The ESIL has a substantially uniform index of refraction n, an ellipsoidal surface portion defining a geometrical ellipsoid with a major axis M, a first geometrical focus $F_1$ and a second geometrical focus $F_2$ separated from first geometrical focus $F_1$ by a separation $S=M/n$. The collimator has an attachment surface portion passing substantially through second geometrical focus $F_2$. The attachment surface portion is for attaching the ESIL to the waveguide such that a collimated light beam propagating along major axis M through the ellipsoidal surface portion converges to a focus substantially at second geometrical focus $F_2$ or at the waveguide.

The attachment of the attachment surface to the waveguide can be performed in many ways. The manner in which the waveguide and ESIL are joined can be adapted to the type of waveguide, e.g., an optical fiber or a buried waveguide. In one embodiment the attachment surface is attached to the waveguide by a fused butt joint.

In one convenient embodiment of the invention the ESIL has a body and a pedestal. The body has the ellipsoidal surface portion through which light passes. The pedestal has the attachment surface portion by which the ESIL is attached to the waveguide. The pedestal can have a pedestal cross section dimensioned to match the waveguide. For example, when the waveguide is an optical fiber the pedestal cross section can equal that of the optical fiber. The pedestal cross section can also be tapered, e.g., it can be tapered down from a larger cross section to the cross section of the waveguide at the attachment surface portion. In another embodiment the ESIL has a cross section matched to the waveguide.

The ESIL, or more generally any SIL, can further be integrated into a monolithic body. The substrate of this monolithic body allows for multiple SILs to be combined in one body. A monolithic body incorporating an array of SILs can be formed using photolithography, etching, ion milling, reflowed photoresist methods, molding, or other common processes. A useful embodiment of the invention has pedestals on the attachment surface portion of the substrate to provide for low-loss coupling and increased precision in attaching waveguides, resulting in improved pointing accuracy of the collimator. A reinforcing structure may also be employed to stabilize the attachment of waveguides to the monolithic body.

The ESIL can be made of one or more sections, depending on the application of the collimator and design requirements. However, it is preferable that the attachment surface portion be flat for easier attachment, e.g., by fusion bonding to the waveguide.

The details of the invention are explained in the detailed description in reference to the attached drawing figures.

DETAILED DESCRIPTION

Figure 1:
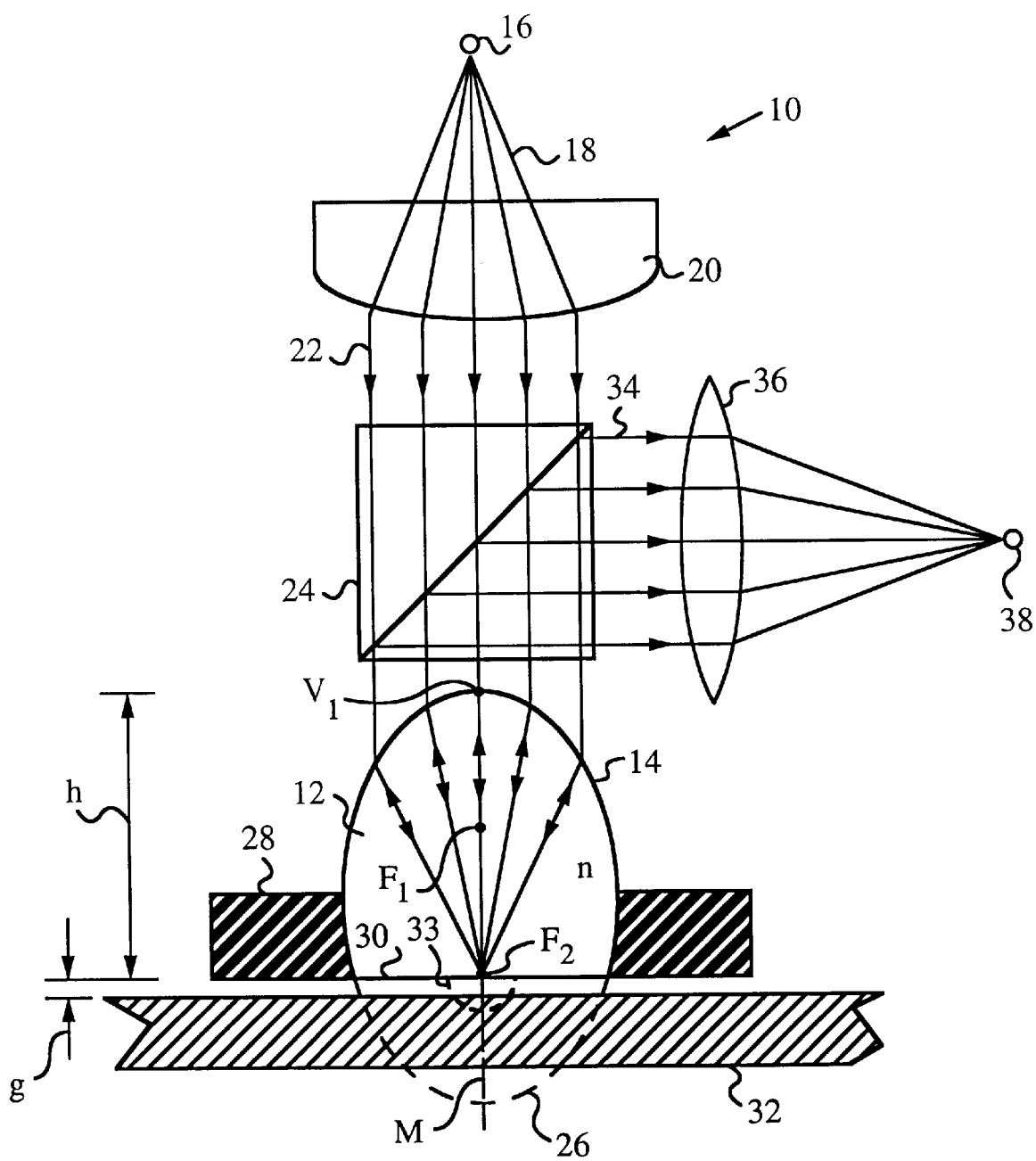
FIG. 1 is a cross sectional side view of an optical system employing an ESIL according to the invention.

FIG. 1 illustrates in a cross-sectional side view a general optical system 10 employing an elliptical solid immersion lens (ESIL) 12 with an ellipsoidal surface portion 14. System 10 has a light source 16 which delivers a diverging light beam 18. A collimating lens 20 is placed in the path of beam 18 to form a collimated light beam 22.

Collimated beam 22 passes through a beam splitter 24 and is incident on the ellipsoidal surface portion 14 of ESIL 12. ESIL 12 is made of a suitable refractive material, e.g., glass or plastic, having a substantially uniform index of refraction n. ESIL 12 is mounted in a support plate 28. Plate 28 can be made of the same material as ESIL 12 or a different material.

In fact, ellipsoidal surface portion 14 defines an entire geometrical ellipsoid 26. The remaining portion of geometrical ellipsoid 26 beyond actual ESIL 12 is drawn in dashed lines. Ellipsoid 26 has a major axis M as well as a first geometrical focus $F_1$ and a second geometrical focus $F_2$. Both geometrical foci $F_1$, $F_2$ lie on major axis M.

ESIL 12 has a flat interface surface 30 which passes through second geometrical focus $F_2$ of ellipsoid 26 such that geometrical focus $F_2$ itself is contained inside ESIL 12. Interface surface 30 should be as close as possible to $F_2$ for best performance. A height h of ESIL 12 is thus defined between interface surface 30 or geometrical focus $F_2$ and a vertex $V_1$, at the top of ellipsoidal surface portion 14.

Interface surface 30 of ESIL 12 is positioned a distance g above an object 32. Distance g is set at less than a wavelength $\lambda$ of light making up beam 22. In other words, object 32 is placed in the near-field region of ESIL 12.

In this embodiment, object 32 is a sample to be examined optically in region 33 of interest. Optical system 10 is a microscope set up to receive a light beam 34 back-scattered or reflected by object 32 upon illumination with beam 22. Back-scattered or reflected beam 34 passes back through ESIL 12 and is deflected by beam splitter 24 and focused by a lens 36 to a detector 38. Advantageously, system 10 employs the principles of confocal microscopy well-known in the art.

Figure 2:
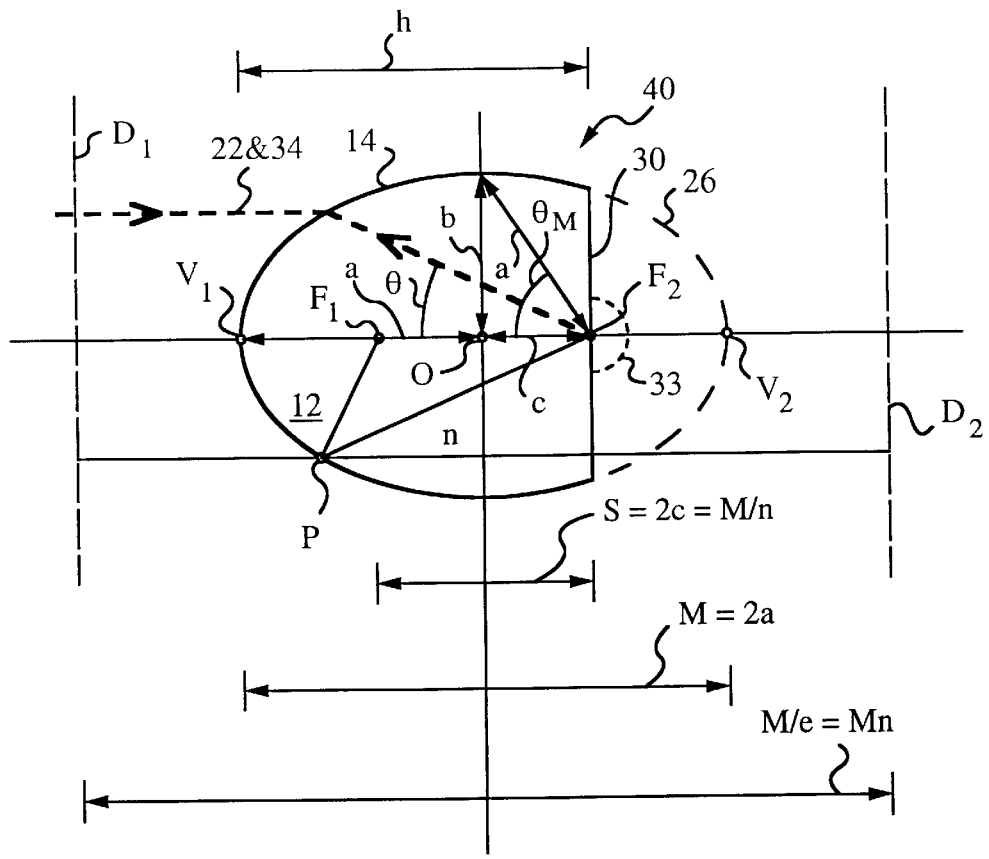
FIG. 2 is a detailed schematic view of the ESIL of FIG. 1.

The operation of ESIL 12 will be better understood by examining FIG. 2 in which geometrical ellipsoid 26 is shown in cross section along major axis M. The cross section of ellipsoid 26 is an ellipse 40; ellipsoid 26 is generated by revolving ellipse 40 around major axis M. Ellipse 40 is defined in accordance with standard geometrical conventions. In particular, ellipse 40 is defined with the aid of a first directrix $D_1$ and a second directrix $D_2$ as follows:

$$\overline{PF_1} = e\overline{PD_1} \text{ and } \overline{PF_2} = e\overline{PD_2}$$

where $\overline{PF_1}$, $\overline{PD_1}$, $\overline{PF_2}$ and $\overline{PD_2}$ represent the distances shown in FIG. 2 between point P and focus $F_1$, directrix $D_1$, focus $F_2$ and directrix $D_2$, respectively, and where e is the eccentricity of ellipse 40. Eccentricity e is defined as:

$$e \equiv \frac{c}{a} = \frac{\sqrt{a^2 - b^2}}{a}.$$

The distance from the center O of ellipse 40 to either focus $F_1$, $F_2$ is c and a separation S between foci $F_1$, $F_2$ is thus equal to 2c (S=2c). The length of major axis M is equal to 2a and the distance between directrices $D_1$, $D_2$ is equal to M/e.

In accordance with the invention, refractive index n of ESIL 12 is selected such that separation S between foci $F_1$, $F_2$ is equal to the length of major axis M divided by refractive index n, in other words S=2c=M/n. Under this condition collimated light beam 22 propagating parallel to major axis M and entering ESIL 12 through ellipsoidal surface portion 14 is focused at second geometrical focus $F_2$. Also, light 34 back-scattered at geometrical focus $F_2$ returns through SIL 12 along the path traversed by beam 22. In fact, light 34 back-scattered in near-field region 33 of geometrical focus $F_2$ returns substantially along the same path as beam 22 and is used for imaging object 32. Both evanescent and plane waves can be involved in the back-scattering process. For a theoretical description of the fields in the near-field region of a SIL see G. S. Kino, SPIE Conference on Far- and Near-Field Optics, "Fields Associated with the Solid Immersion Lens", SPIE, Vol. 3467, pp. 128–37 (1998).

It will be appreciated by a person skilled in the art that the present design of ESIL 12 integrates the function of objective lens and the SIL as used in prior art systems. In other words, ESIL 12 is actually an integrated objective and SIL lens. The effective NA, $NA_{eff}$, and the maximum effective NA, max. $NA_{eff}$, can both be expressed in terms of index n of ESIL 12 as follows:

$$NA_{eff} = n \sin \theta$$

$$\max. NA_{eff} = n \sin \theta_M = \sqrt{n^2 - 1}$$

The design parameters of ESIL 12 are advantageously expressed in terms of refractive index n. Table 1 gives the design parameters for several particular choices of index n of ESIL 12. The design parameters are expressed in terms of n as well as in terms of lengths a, b and eccentricity e.

TABLE 1

| n | $\sqrt{n^2 - 1}$ max. $NA_{eff}$ | $\sqrt{n^2 - 1/n}$ b/a | 1/n e | $\lambda/2 \cdot NA_{eff}$ spot size at $\lambda = 400$ nm |
|---|---|---|---|---|
| 1.5 | 1.118 | .745 | .667 | 170 nm |
| 2.0 | 1.732 | .866 | .500 | 115 nm |
| 2.5 | 2.291 | .917 | .400 | 87 nm |
| 3.0 | 2.828 | .943 | .333 | 70 nm |
| 3.5 | 3.354 | .958 | .286 | 59 nm |

Although in the above embodiment ESIL 12 is used in microscope 10 it can be implemented in any other optical system requiring small spot size, high resolution and mechanical stability obtained by virtue of eliminating the objective lens. Specifically, ESIL 12 can be used as a collimator for waveguides such as optical fibers or buried waveguides.

Figure 3A:
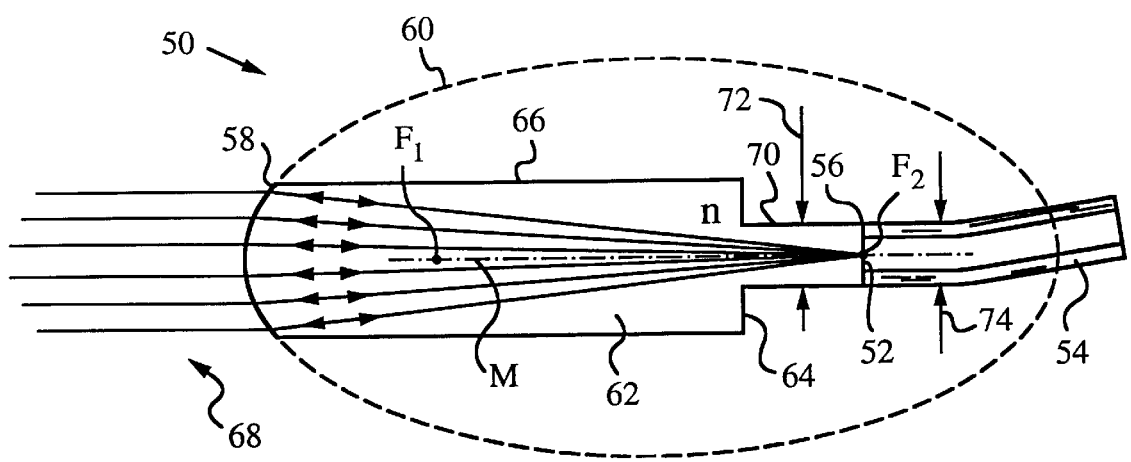
FIGS. 3A–D are cross sectional side views illustrating various collimators employing ESILs according to the invention.

FIG. 3A illustrates an ESIL 50 according to the invention with an attachment surface portion 52, which is also the interface surface portion passing through or very near second geometrical focus $F_2$ of ESIL 50. ESIL 50 has an ellipsoidal surface portion 58, which is smaller than in the previous embodiment, and defines a geometrical ellipsoid 60. As before, ellipsoid 60 has a major axis M along which lie the two foci $F_1$, $F_2$ at the separation governed by S=M/n.

In this embodiment ESIL 50 is a collimator integrated with a waveguide 54, in this case an optical fiber, by a fused butt joint 56 at attachment surface portion 52. ESIL 50 has a body 62 which terminates at ellipsoidal surface portion 58. Body 62 has a side wall 66 and a flat bottom 64 opposite ellipsoidal surface portion 58. It will be appreciated by a person skilled in the art that the exact shape of side wall 66 and bottom 64 are a matter of the designer's choice as long as a collimated light beam 68 propagating along major axis M through ellipsoidal surface portion 58 converges to an optical focus at second geometrical focus $F_2$. In other words, the design of body 62 should not interfere with the propagation of light 68 through body 62.

A cylindrical protrusion or pedestal 70 extends from bottom 64 of body 62. It is important that the region between body 62 and pedestal 70 preserve a uniform refractive index n. To ensure this body 62 and pedestal 70 can be molded as one part out of moldable glass or plastic or produced at the same time by a photolithographic technique. For further information on photolithographic and other fabrication techniques which can be used in the manufacture of ESIL 50 see, e.g., Optics & Photonics News, September 1999, pp. 19–22, and in "Microoptics", by Stefan Sinzinger and Jurgen Jahns, Wiley-VCH, 1999.

Pedestal 70 has a cross section 72 which closely matches a cross section 74 of optical fiber 54. This matching of cross sections provides for both parts having a similar thermal mass, and thus enables better splicing and alignment of ESIL 50 with optical fiber 54. Proper alignment should position the center of the core of optical fiber 54 as close as possible to second geometrical focus $F_2$. Optical fiber 54 can be a single mode or multimode fiber. In this manner efficient in-coupling of collimated light 68 into fiber 54 as well as collimation of light exiting fiber 54 is achieved. The method of fusing fiber 54 to attachment surface portion 52 to obtain good alignment and reliable joint 56 is known in the art. Further information on this technique can be found in the patent references listed in the background section of this patent such as U.S. Pat. Nos. 4,962,988; 5,299,274. It should be noted that it is possible that attachment surface portion 52 for splicing the ESIL 50 to waveguide 54 exhibit a mechanical feature, e.g., a protrusion or circumferential ridge to further improve alignment. However, when using existing fusion splicing techniques it is preferable that the attachment surface portion be substantially flat.

Since cross section 72 of pedestal 70 is substantially matched to cross section 74 of optical fiber 54, existing fiber optic fusion splicing methods using electric arc or laser heat sources can be used. For example, in some techniques for fusion splicing of single mode fibers, first the alignment is done by video camera keeping a small gap between the fibers during heating by an electric arc, then the gap is closed once the glass at the ends is heated just below the melting temperature. This method, as well as other methods may not require a gap to accomplish uniform heating depending on the type of heat source used and how the heat is supplied.

In a particular embodiment of ESIL 50 the material is fused silica with a refractive index of n=1.46 at a wavelength of 550 nm to match the fused silica of fiber 54 which has a refractive index of n=1.46 at 550 nm as well. The total thickness of ESIL 50 is 2.5 mm. Pedestal 70 is 0.5 mm long and has a diameter of 125 microns while body 62 has a diameter of 500 microns and is 2.0 mm long. The ellipsoidal eccentricity e=1/n=0.6849; Major axis M=2.968 mm; separation between foci S=2.033 mm and the numerical aperture of ESIL 50 $NA_{lens}$=nsinq=0.146. The last exceeds the numerical aperture of fiber 54 which is $NA_{fiber}$=0.13. The beam diameter of collimated light 68 is 0.446 mm. It will be appreciated that these values are merely exemplary of one particular design of ESIL 50. For example, infrared wavelengths are used in telecommunications systems and require single mode optical fibers having a typical core of 8 microns diameter and a cladding of 125 microns diameter. Here, ESIL 50 collimator design will be determined mainly by the desired diameter of collimated beam of light 68 and index of refraction n of the material of ESIL 50 at the particular wavelength of operation.

Figure 3B:
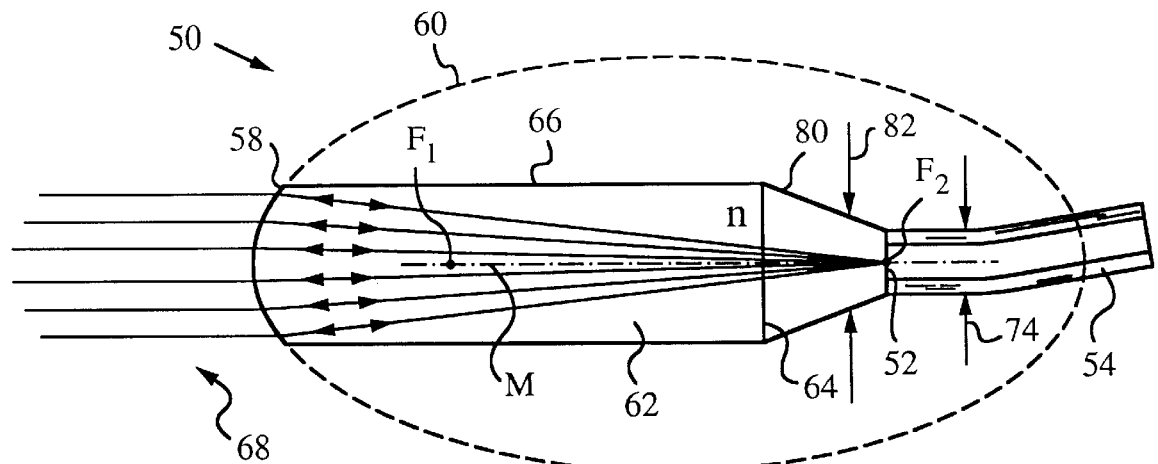

FIG. 3B illustrates another embodiment of ESIL 50 collimator in which like reference numbers are used to designate corresponding parts from FIG. 3A. In contrast to the embodiment of FIG. 3A, ESIL 50 has a tapered pedestal 80. In particular, a cross section 82 of pedestal 80 is matched to the cross section of body 62 at bottom 64. The taper decreases from this larger cross section at bottom 64 to cross section 74 of fiber 54 at attachment surface portion 52. In this embodiment ESIL 50 can also be fabricated as one part or it can be made of two parts or sections, e.g., body 62 and tapered pedestal 80 separately. The taper of pedestal 80 enables good alignment and ensures reliable bonding with body 62. In fact, pedestal 80 could first be spliced with fiber 54 and then spliced or bonded by other means to body 62.

Figure 3C:
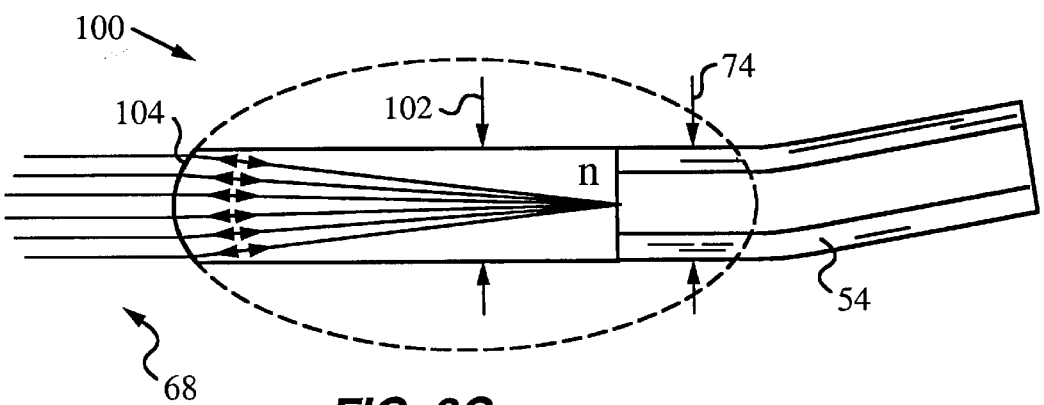

FIG. 3C illustrates an ESIL 100 collimator which is made of one section. ESIL 100 has an ellipsoidal surface portion 104 and cross section 102 matched to cross section 74 of fiber 54. This permits splicing ESIL 100 directly to fiber 54 without the use of pedestals. In this embodiment the reduced cross section of ESIL 100 at ellipsoidal surface portion 104 will reduce the collimated beam diameter of light 68.

Figure 3D:
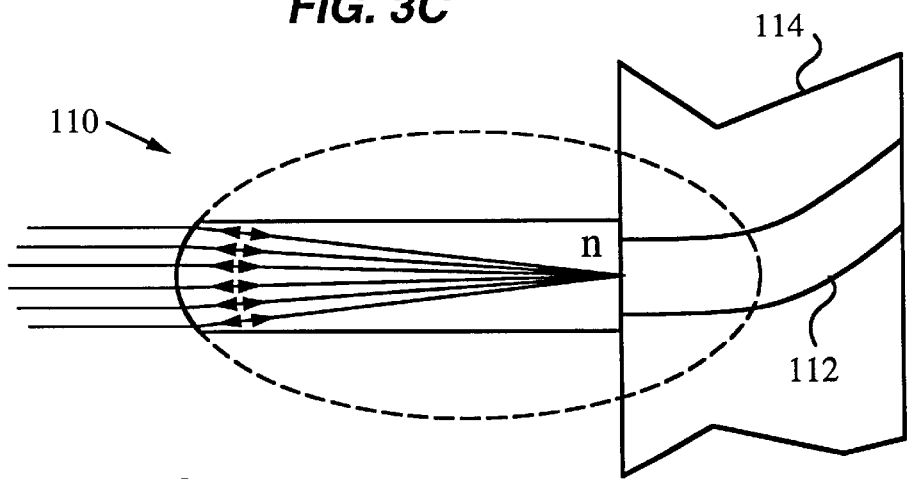

FIG. 3D illustrates an ESIL 110 collimator attached to a waveguide 112 buried in a structure 114. In this case, where the cross section of ESIL 110 is substantially smaller than the cross section of structure 114 the attachment can be accomplished by a laser fusion splice method as disclosed in U.S. Pat. No. 6,033,515, or by use of adhesives or other methods.

Figure 4:
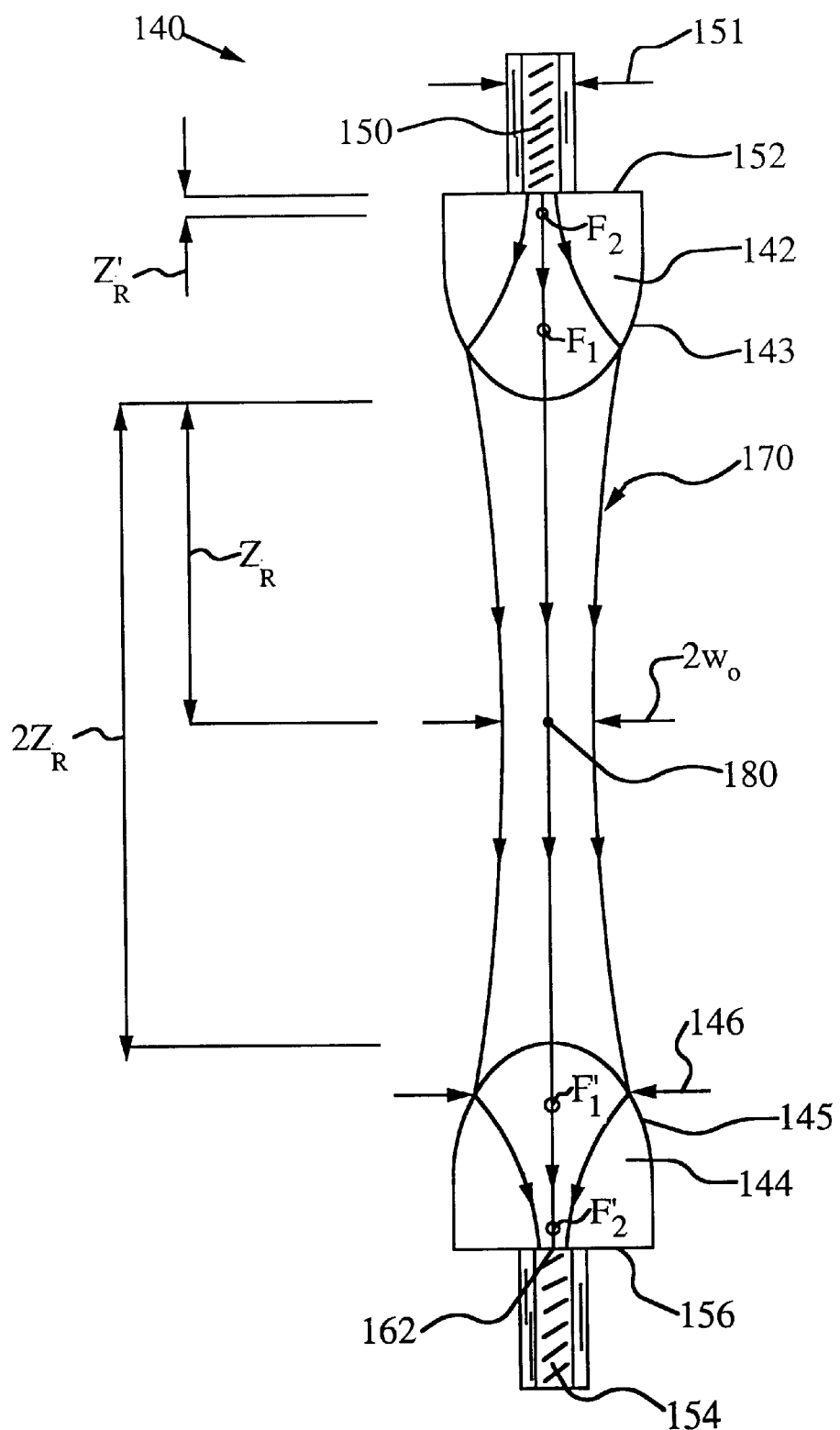
FIG. 4 is a cross sectional side view of an optical system employing two ESILs with a collimated Gaussian beam as described by the invention.

FIG. 4 illustrates in a cross sectional side view of an optical system 140 employing two ESIL collimators for use in a low-loss optical relay of diffraction-limited Gaussian beams.

The ESIL collimators 142 and 144 have similar properties to ESIL 12 of FIG. 1. Single-mode waveguide 150 is attached to attachment surface portion 152 of ESIL 142. A Gaussian beam is shown propagating from single-mode waveguide 150, through ESIL 142, and exiting the ellipsoidal surface portion 143 as substantially collimated Gaussian beam 170.

ESIL 144 and single-mode waveguide 154 comprise the second half of the optical relay. Substantially collimated Gaussian beam 170 is incident on ESIL 144 at ellipsoidal surface portion 145 and focused to a Gaussian beam waist substantially at point 162 on the attachment surface portion 156 where it propagates through single-mode waveguide 154.

A person skilled in the art will recognize that a substantially collimated diffraction-limited Gaussian beam will experience diffraction spreading as it propagates away from the waist region. In this figure the Gaussian beam waist region is located at 180. The Gaussian beam waist diameter is defined as $2w_o$ where $w_o$ is the radius of the Gaussian beam waist under consideration where the field amplitude of the intensity profile drops to 1/e of its peak value at the center of the beam. A further property of Gaussian beams is that as the input spot size $w_o'$ is made smaller, the beam expands more rapidly due to diffraction; remains collimated over a shorter distance in the near field; and diverges at a larger beam angle in the far field.

The distance a collimated Gaussian beam travels from the waist before the beam diameter increases by $\sqrt{2}$ is denoted as the "Rayleigh Range" and defined as:

$$Z_R = \frac{\pi w_o^2}{\lambda}$$

where $\lambda$ is the wavelength of the beam in a vacuum.

Placing attachment surface portion 152 at or near $F_2$ would result in a Gaussian beam waist $w_o$ at or near the ellipsoidal surface portion 143 after which point the beam would continually expand and diverge.

In the example shown, attachment surface portion 152 is offset from $F_2$, away from $F_1$, at a distance $Z_R'$. $Z_R'$ is the Rayleigh Range defined by the Gaussian beam waist $w_o'$ at the interface between attachment surface portion 152 and waveguide 150. The Gaussian beam waist $w_o'$ is defined by the mode-field diameter 151 of waveguide 150. In the case of telecom type single-mode optical fiber (e.g., Corning SMF-28) at a wavelength of 1550 nm, the mode-field diameter is typically 25% larger than its core diameter of 8 microns. Thus:

$$Z_R' = \frac{\pi \omega_o'^2}{\frac{\lambda}{n}}$$

where n is the index of refraction of ESIL 142 and $\lambda$ is the wavelength in vacuum.

As a specific example we will assume waveguide 150 is a Corning SMF-28 fiber, which has a core diameter $\approx 8$ $\mu$m and a mode-field diameter $\approx 10$ $\mu$m Therefore $w_o'=5$ $\mu$m, and if we assume a standard wavelength $\lambda=1550$ nm, and n=1.44 for ESIL 142, then $Z_R' \approx 75$ $\mu$m.

The previous example shows an optimized case for the described system. In this case, the second ellipsoidal surface portion 145 of ESIL 144 placed at a distance $2Z_R$ will have the substantially collimated Gaussian beam 170 incident on ellipsoidal surface portion 145 having a diameter 146 of $\sqrt{2} \times 2w_o$. Accordingly, a Gaussian beam waist is formed at attachment surface portion 156 where it propagates through single-mode waveguide 154.

Figure 5:
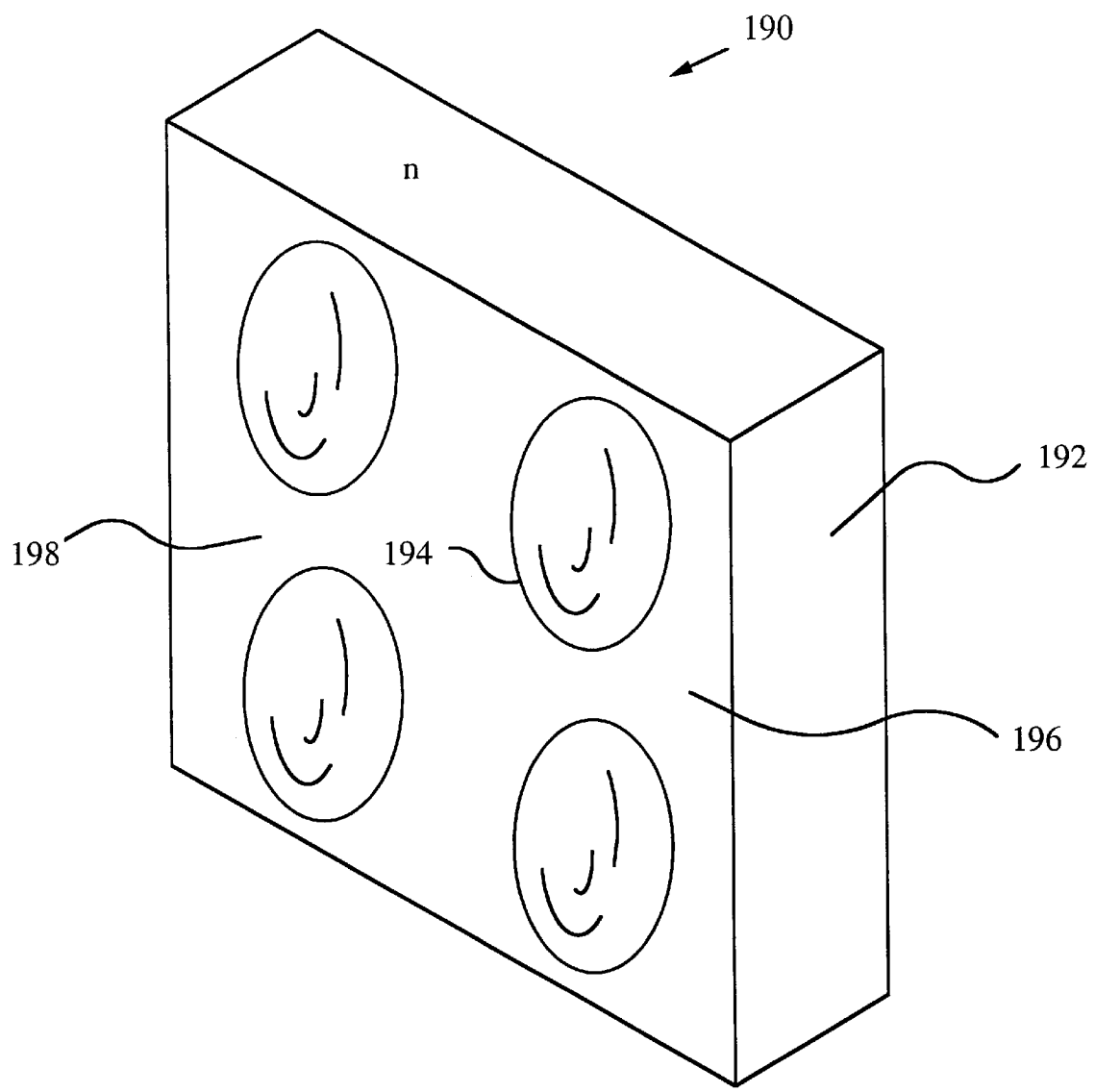
FIG. 5 is an orthographic view of multiple SILs arranged in a monolithic body.

FIG. 5 is an orthographic view of monolithic body 190 comprised of substrate 192. Substrate 192 should have a substantially uniform index of refraction n and could be made of silicon, zinc selenide, fused silica, moldable glass, plastic, or any other suitable optical material.

Multiple solid immersion lenses similar to SIL 194 form collimator array 198 on the planar surface 196 of substrate 192. The SILs of collimator array 198 are integrated with substrate 192 of monolithic body 190. Prior art discusses how lenses can be formed from a monolithic body having a substrate with uniform index of refraction using processes such as photolithography, etching, ion milling, reflowed photoresist methods, molding, and others.

The SILs of collimator array 198 could be formed with a variety of surface profiles including ellipsoidal or substantially ellipsoidal profiles. A person skilled in the art will recognize that substantially ellipsoidal profiles can be used when they satisfy the desired optical performance parameters. Alternatively, lens profiles such as spherical, hemispherical, aspherical, and others can also be used. Thus, a collimator array having a plurality of SILs arranged in a specific pattern, such as collimator array 198, can be used to provide a plurality of collimated beams from an optical waveguide array having a plurality of optical waveguides arranged in a matching pattern.

The SILs of collimator array 198 are preferably of the ESIL design as described in FIGS. 1–4, and may be further arranged to form collimator array 198 in various configurations on planar surface 196 of monolithic body 190. An example of an advantageous configuration would be to arrange multiple SILs to form a two-dimensional N×M matrix, where N represents the number of rows of SILs, and M represents the number of columns of SILs.

A specific example of an array configuration would comprise the monolithic body having an array comprised of 64 SILs arranged in an 8×8 matrix. This monolithic body would have beneficial use in a low loss optical relay for fiber optic applications such as in fiber optic switches, Add/Drop multiplexers, wavelength multiplexers, wavelength demultiplexers, optical cross-connects, and other building blocks of photonic networks.

Figure 6A:
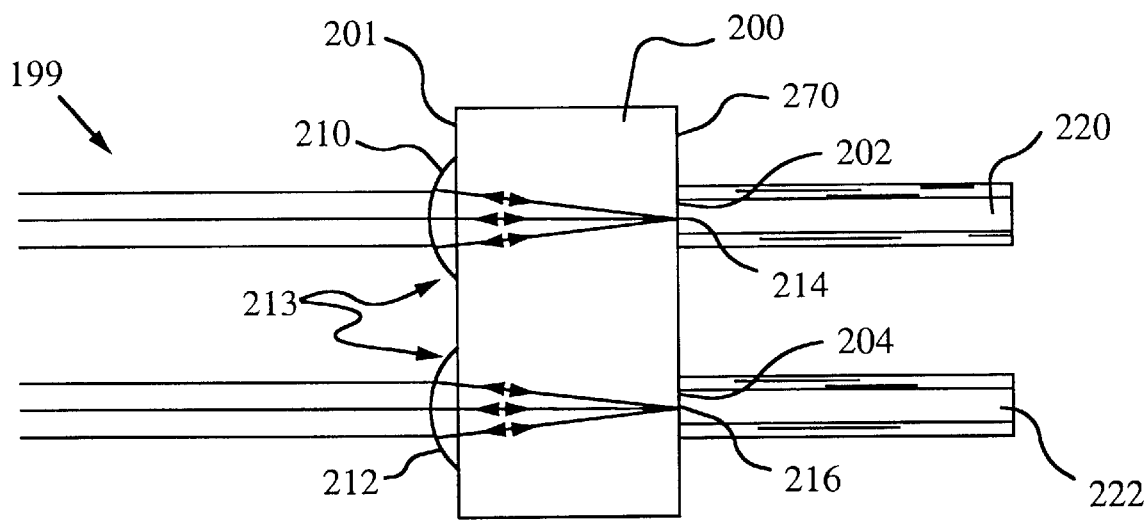
FIGS. 6A–D are cross sectional side views illustrating collimators employing multiple SILs according to the invention.

FIG. 6A illustrates a monolithic body 200 according to the invention integrating an array 213 of SIL 210 and SIL 212 with monolithic body 200 on planar surface 201. Collimated Gaussian beams 199 pass through SIL 210 and SIL 212 to focus at or near point 214 and point 216 respectively. Parallel to planar surface portion 201 is surface portion 270 passing through points 214 and 216. The monolithic body is comprised of a substrate which should have a substantially uniform index of refraction. Waveguide 220 is attached to surface portion 270 at attachment surface portion 202 in alignment with focus 214. Waveguide 222 is likewise attached to surface portion 270 at attachment surface portion 204 in alignment with focus 216. Possible methods of attachment discussed in the prior art include laser fusion splicing and thermal bonding.

Figure 6B:
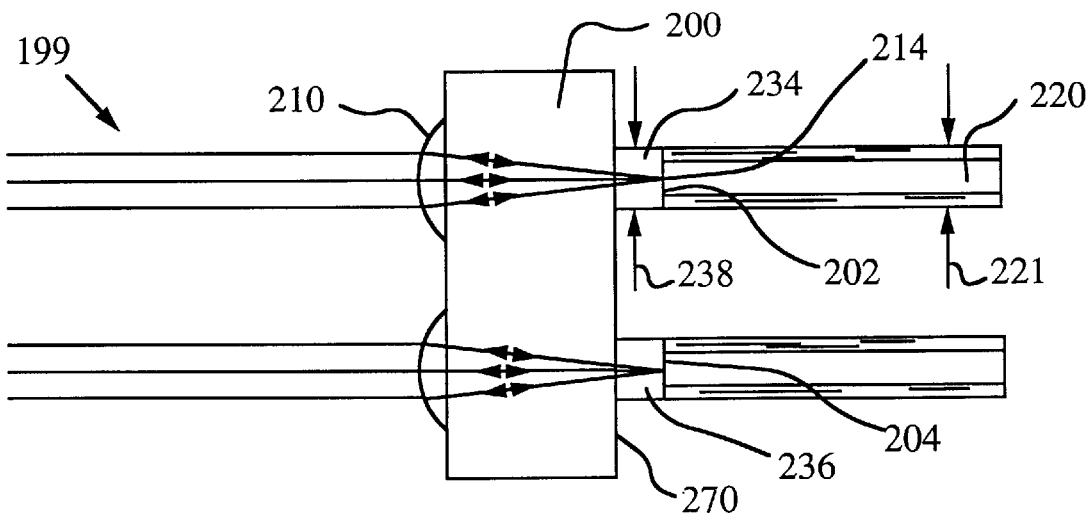

FIG. 6B illustrates another embodiment of monolithic body 200 in which like reference numbers are used to designate corresponding parts from FIG. 6A. In contrast to the embodiment of FIG. 6A, monolithic body 200 has the addition of cylindrical protrusions or pedestals 234 and 236 extending from surface portion 270 with attachment surface portions 202 and 204.

It is important that the region between monolithic body 200 and pedestals 234 and 236 preserve a uniform refractive index n. To ensure this monolithic body 200 and pedestals 234 and 236 can be molded as one part out of moldable glass or plastic or produced at the same time by a photolithographic technique. For further information on photolithographic and other fabrication techniques which can be used in the manufacture of monolithic body 200, e.g., Optics & Photonics News, September 1999, pp. 19–22.

Pedestal 234 has a cross section 238 which substantially matches a cross section 221 of optical fiber 220. This matching of cross sections enables better splicing and alignment of monolithic body 200 with optical fiber 220. Proper alignment should position the center of the core of optical fiber 220 as close as possible to the centerline of SIL 210. Optical fiber 220 can be a single mode or multimode fiber. In the case where optical fiber 220 is a single-mode fiber, then efficient in-coupling of collimated Gaussian beam 199 into fiber 220 as well as collimation of light exiting fiber 220 is achieved. The method of fusing fiber 220 to attachment surface portion 202 to obtain good alignment and a reliable joint is known in the art. Further information on this technique can be found in the patent references listed in the background section of this patent such as U.S. Pat. Nos. 4,962,988; 5,299,274; 4,737,006; 6,033,515. It should be noted that it is possible that attachment surface portion 202 for splicing the monolithic body 200 to waveguide 220 exhibit a mechanical feature, e.g., a protrusion or circumferential ridge to further improve alignment. However, when using existing fusion splicing techniques it is preferable that the attachment surface portion be substantially flat.

Since cross section 238 of pedestal 234 is substantially matched to cross section 221 of optical fiber 220, existing fiber optic fusion splicing methods using electric arc or laser heat sources can be used. For example, in some techniques for fusion splicing of single mode fibers, first the alignment is done by video camera keeping a small gap between the fibers during heating by an electric arc, then the gap is closed once the glass at the ends is heated just below the melting temperature. This method, as well as other methods may not require a gap to accomplish uniform heating depending on the type of heat source used and how the heat is supplied.

Figure 6C:
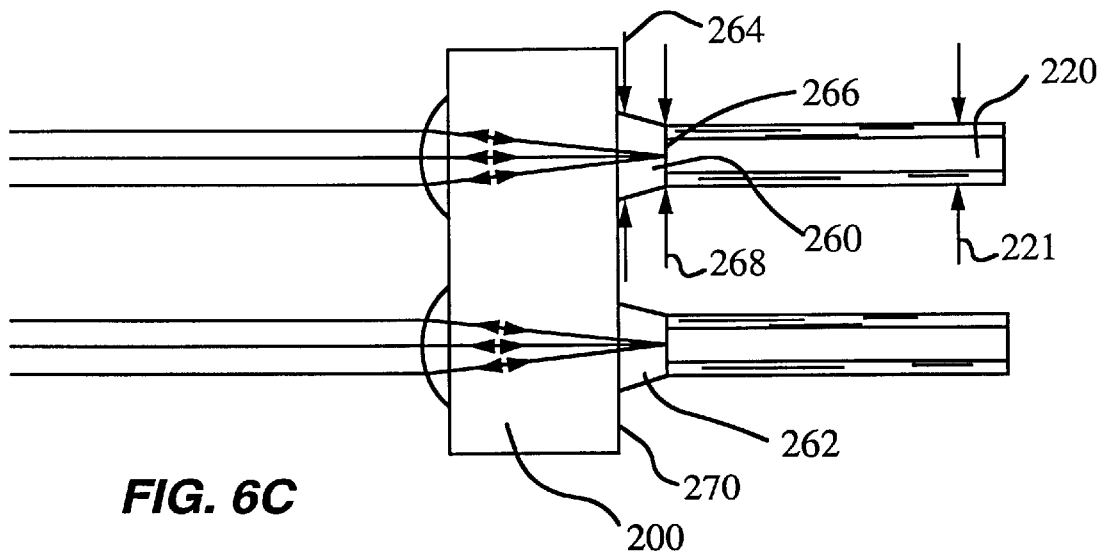

FIG. 6C illustrates a further embodiment of monolithic part 200 illustrated in FIG. 6A. In contrast to the embodiment of FIG. 6B, monolithic body 200 has tapered pedestals 260 and 262. In particular, a cross section 264 of pedestal 260 is larger than cross section 221 of waveguide 220 at attachment surface portion 266. The taper decreases from a larger cross section at surface portion 270 to cross section 221 of fiber 220 at attachment surface portion 266. In this embodiment monolithic body 200 can also be fabricated as one part or it can be made of two parts or sections, e.g., monolithic body 200 and tapered pedestal 260 separately. The taper of pedestal 260 enables good alignment and ensures reliable bonding with body 200. In fact, pedestal 260 could first be spliced with fiber 220 and then spliced or bonded by other means to monolithic body 200.

Figure 6D:
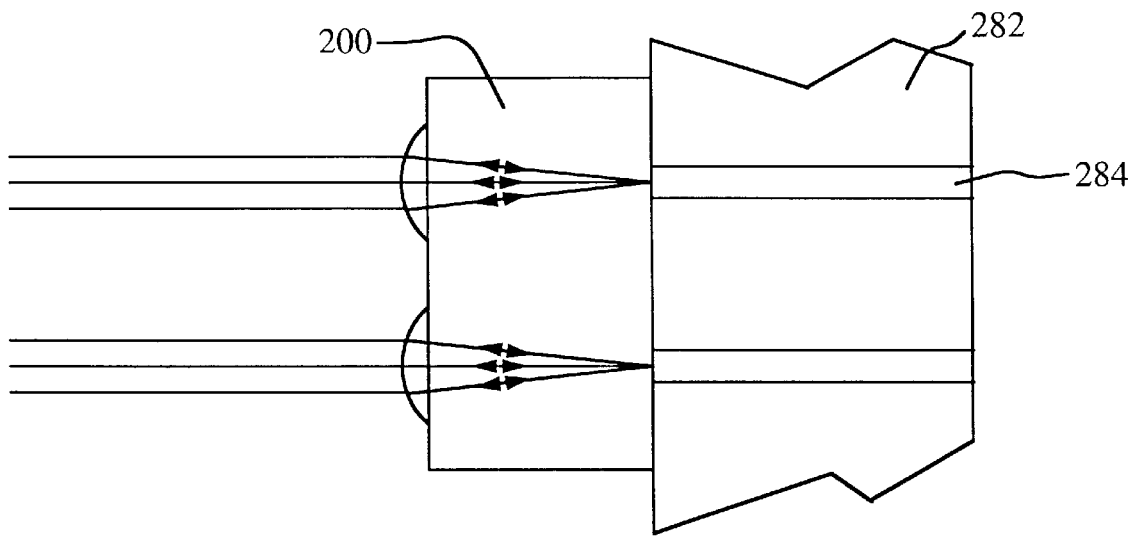

FIG. 6D illustrates a monolithic body 200 attached to a waveguide 284 buried in a structure 282. In this case, where the cross section of monolithic body 200 is substantially smaller than the cross section of structure 282 the attachment can be accomplished by a laser fusion splice method as disclosed in U.S. Pat. No. 6,033,515, or by use of adhesives or other bonding methods.

Figure 7A:
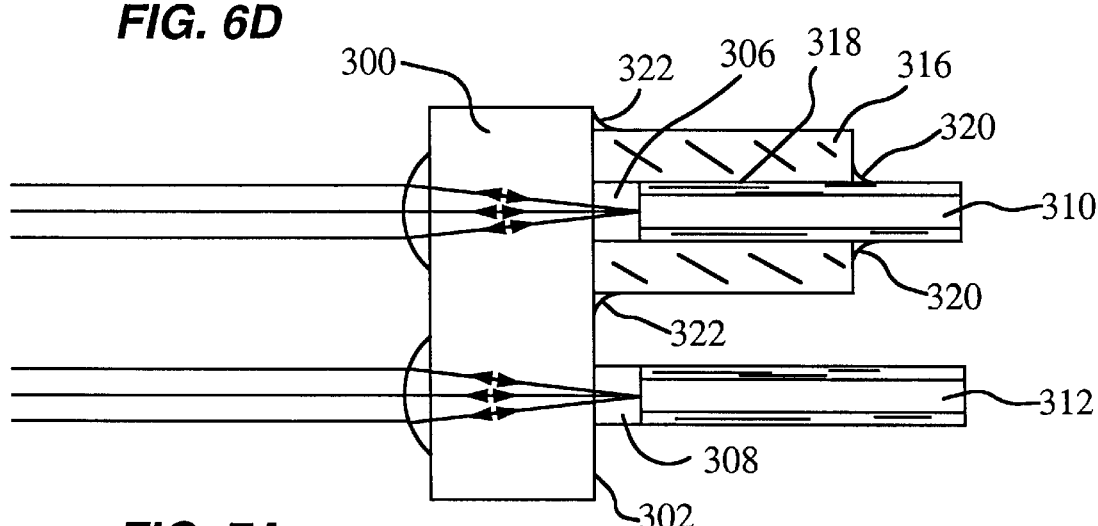
FIGS. 7A–B are cross sectional side views of reinforcing structures as described by the invention.

Illustrated in FIG. 7A is monolithic body 300 similar to that described in FIGS. 6A–D. Pedestals 306 and 308 are integrated with monolithic body 300 on surface portion 302. Waveguides 310 and 312 are attached to pedestals 306 and 308 respectively. In instances where waveguides 310 and 312 may be very fragile (e.g., single-mode optical fibers typically have a cladding diameter of 125 microns and a core diameter of 8 microns), then a reinforcing structure may be required to prevent a failure. Supporting the attachment of waveguide 310 to pedestal 306 is reinforcing structure 316. Reinforcing structure 316 is in contact with waveguide 310 along surface 318 and is attached at joint 320. Reinforcement structure 316 is also attached to monolithic body 300 at joint 322. In this embodiment, the reinforcing structure is shown as a hollow tubular member. A person skilled in the art will recognize that the material chosen for the reinforcing structure is a matter of design preference. This material may be comprised of glass, plastic, metal, silicon, or a variety of other suitable options. The method of attachment of reinforcing structure 316 to waveguide 310 and monolithic body 300 will be determined by the materials chosen. Prior art discusses how this attachment can be made using adhesives and thermal bonding processes such as soldering or thermal-anodic bonding methods.

It should be recognized by one skilled in the art that reinforcing structure 316 not only supports the attachment of waveguide 310 to monolithic body 300, an appropriate bonding material at attachment joints 320 and 322 will also absorb stress and strain put on the system, thus making the system more robust and stable.

Figure 7B:
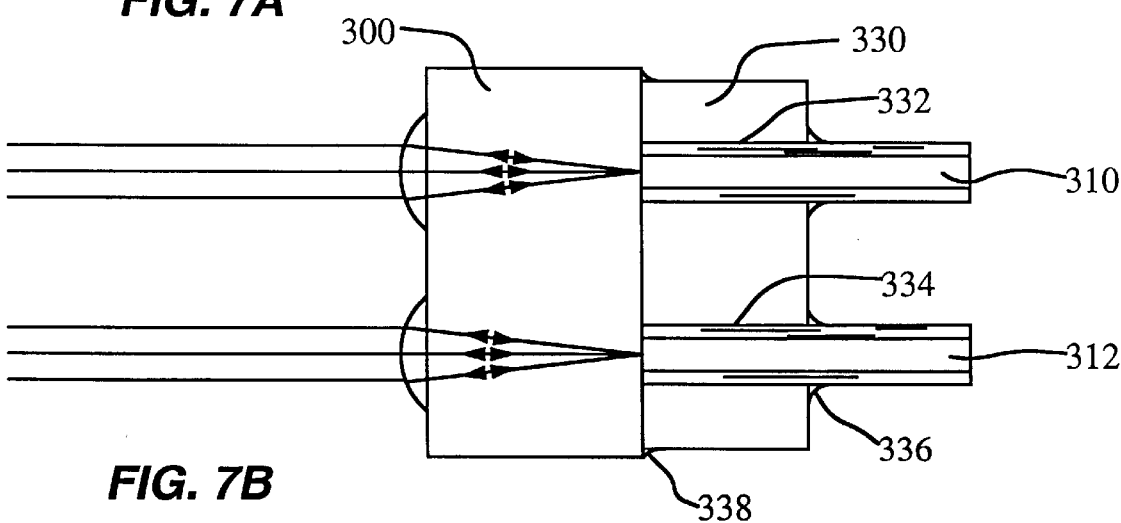

FIG. 7B illustrates a further embodiment of FIG. 7A. In contrast to tubular reinforcing structure 316 of FIG. 7A, the reinforcing structure comprises block 330 having hollowed portions 332 and 334 to accommodate waveguides. Block 330 is attached to waveguides 310 and 312 at joints 336, and to monolithic body 300 at joints 338.

The above embodiments are presented to illustrate the present invention and are not to be construed as limitations thereof. Accordingly, the scope of the invention should be determined by the following claims and their legal equivalents:

What is claimed is:

1. A collimator array integrated with a plurality of waveguides for providing a plurality of substantially collimated beams, said collimator array comprising:
   a) a plurality of ellipsoidal solid immersion lenses formed in a monolithic body, said lenses comprising respective ellipsoidal surface portions defining respective geometrical ellipsoids having eccentricity e=1/n, said monolithic body having a substantially uniform index of refraction n; and
   b) at least one attachment surface portion for attaching said monolithic body to said plurality of waveguides.

2. The collimator array of claim 1, wherein said monolithic body comprises a plurality of sections having substantially the same index of refraction.

3. The collimator array of claim 2, wherein said plurality of sections are bonded by a means wherein said means is selected from the group consisting of adhesive bonds, thermal bonds, and laser fusion bonds.

4. The collimator array of claim 2, wherein at least one of said plurality of sections comprises a material wherein said material is selected from the group consisting of fused silica, moldable glass, and plastic.

5. The collimator array of claim 2 having a plurality of attachment surface portions, wherein a portion of said plurality of sections are pedestals integrated with said monolithic body, said pedestals comprising respective attachment surface portions for attaching to said plurality of waveguides.

6. The collimator array of claim 2, wherein one of said plurality of sections comprises said ellipsoidal surface portions.

7. The collimator array of claim 1, wherein said plurality of ellipsoidal solid immersion lenses are configured to provide a one-dimensional array pattern of N collimated beams.

8. The collimator array of claim 1, wherein said plurality of ellipsoidal solid immersion lenses are configured to provide a two-dimensional array pattern of N×M collimated beams.

* * * * *